United States Patent [19]

Wollar

[11] Patent Number: 4,842,237
[45] Date of Patent: Jun. 27, 1989

[54] ONE-PIECE WIRE RETAINER CLIP MOUNTABLE ON THREADED STUD

[75] Inventor: Burnell J. Wollar, Barrington, Ill.

[73] Assignee: Phillips Plastics Corporation, Phillips, Wis.

[21] Appl. No.: 275,574

[22] Filed: Nov. 23, 1988

[51] Int. Cl.⁴ .............................................. H02G 3/26
[52] U.S. Cl. .................................... 248/548; 248/73; 248/74.4
[58] Field of Search ...................... 248/548, 49, 62, 65, 248/67.5, 68.1, 73, 74.1, 74.4, 74.5, 220.2, 224.3, 309.1, 313, 316.1, 316.6, 500, 505, 507, 508, 510; 174/156, 157

[56] References Cited

U.S. PATENT DOCUMENTS

| | | |
|---|---|---|
| 2,935,553 | 5/1960 | Showman ........................... 174/157 |
| 4,588,152 | 5/1986 | Ruehl ................................. 248/548 |

FOREIGN PATENT DOCUMENTS

| | | | |
|---|---|---|---|
| 908270 | 7/1949 | Fed. Rep. of Germany ...... | 174/156 |
| 1206504 | 12/1965 | Fed. Rep. of Germany ...... | 174/157 |
| 1263128 | 3/1968 | Fed. Rep. of Germany ...... | 174/157 |
| 2618067 | 9/1978 | Fed. Rep. of Germany ...... | 174/157 |
| 3236982 | 4/1984 | Fed. Rep. of Germany ..... | 248/68.1 |
| 3325685 | 1/1985 | Fed. Rep. of Germany ..... | 248/68.1 |
| 1463765 | 5/1967 | France ................................ | 248/74.4 |
| 592770 | 9/1947 | United Kingdom ................ | 174/156 |
| 1206235 | 9/1970 | United Kingdom .................. | 248/73 |
| 1403714 | 8/1975 | United Kingdom ............... | 248/68.1 |

Primary Examiner—Ramon O. Ramirez
Assistant Examiner—Robert A. Olson
Attorney, Agent, or Firm—James E. Nilles; Thomas F. Kirby

[57] ABSTRACT

A one-piece wire retainer clip comprises a first tube axially slidable onto and frictionally engageable with a threaded stud on a structure. A pair of resiliently movable spaced-apart legs are connectd to the first tube and define a wire-receiving slot having an opening on one side through which wires are laterally insertable into the slot. A second tube is axially aligned with and slidable manually onto the first tube. A slot closure plate is connected to and movable with the second tube. Releasably interengageable latches are provided on the legs and on the slot closure plate. A frangible web connected between the tubes initially maintains the second tube in an open position wherein the closure plate is spaced from the slot opening. The web remains intact as manual force is axially exerted on the second tube to force the first tube onto the stud. Then, the web fractures, the second tube telescopes onto the first tube, the closure plate is moved to a closed position wherein it blocks the slot opening, the latches interengage to lock the closure plate in closed position. The latches are releasable to allow the closure plate to be returned to open positon for wire removal and to allow removal of the second tube so the first tube can be pulled off the stud.

9 Claims, 2 Drawing Sheets

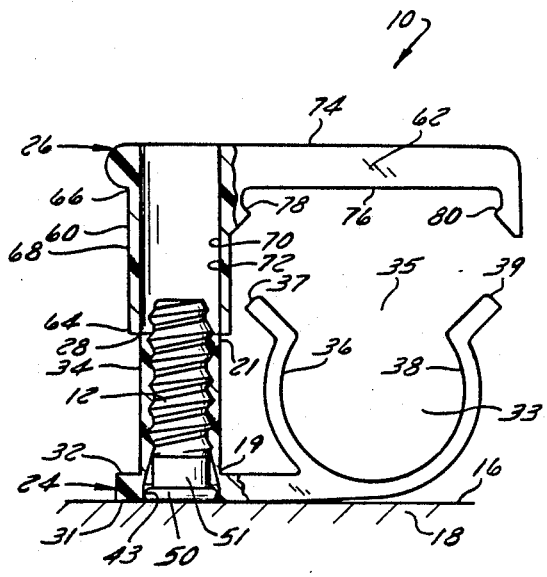
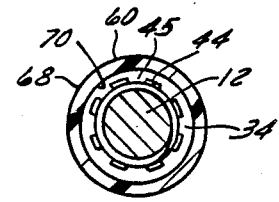
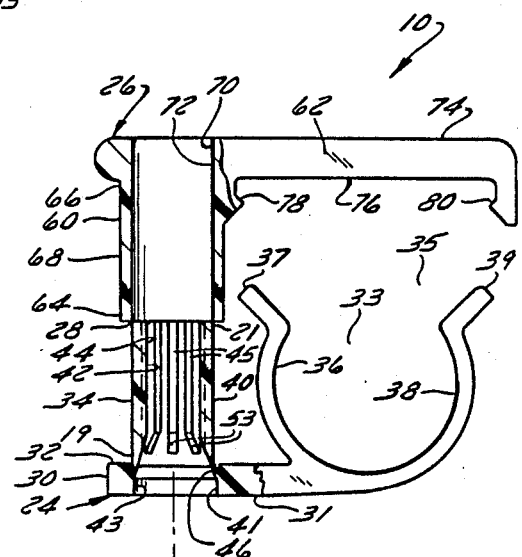
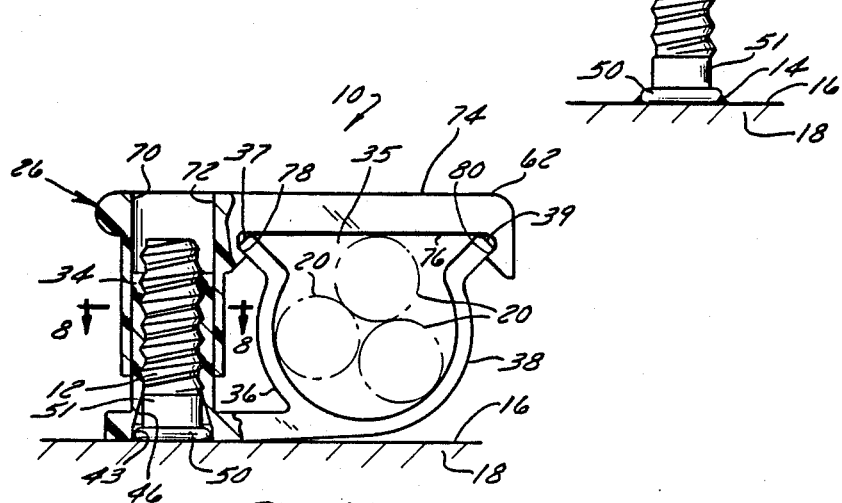

ONE-PIECE WIRE RETAINER CLIP MOUNTABLE ON THREADED STUD

BACKGROUND OF THE INVENTION

1. Field of Use

This invention relates generally to a one-piece retainer clip for releasably securing elongated members, such as wires or tubes, to a structure, such as a panel, having a threaded or serrated stud rigidly affixed thereto.

2. Brief Description of the Prior Art

Various types of prior art retainer clips are available to secure elongated members, such as electric wires or tubes, to various kinds of structures. All such clips include means to mount the clip on the structure and means to secure the elongated members to the clip.

The automotive industry presently employs a two-piece plastic prior art clip comprising a first piece which is mountable on a threaded metal stud projecting from a metal panel (such as a firewall) and a separate second piece which is then releasably attachable to the first piece to secure the wires in an open-ended wire-receiving slot formed on the first piece.

The two separate pieces forming the clip are each fabricated separately in different dies and/or presses by a process of injection molding and are manually pre-assembled just prior to or during installation. The first part comprises a base plate on which are mounted a first tube having a first stud-receiving bore therethrough and a pair of bifurcated resilient legs defining a wire-receiving slot having a slot opening at one end for receiving wires inserted laterally thereinto. The second part comprises a second tube having a second bore for telescopically receiving the first tube and a closure plate connected thereto for closing the slot opening. Interengageable latch means are provided on the free ends of the legs and on the edges of a leg-receiving aperture formed in the closure plate. After the first part has been selected and manually installed on the stud and the wires have been manually installed in the slot, the second tube of the second part is selected and manually mounted on the first tube of the first part and slid to a closed position wherein the closure plate closes the slot opening to secure the wires in the slot and wherein the latch means interengage to releasably maintain the two parts in closed position. The latch means are manually releasable to enable the second section to be slid to open position wherein the wires are laterally removable from the slot. The second section can be entirely removed manually to enable the first section to be pulled off of the stud.

The aforedescribed prior art two-component clip is generally satisfactory for its intended use. However, since it requires two separate injection molding presses and/or two different sets of dies to fabricate, the cost of manufacturing is unnecessarily high. Furthermore, since its installation requires manual selection of two discrete different components, separate sequential manual installation steps, and manual alignment of the second component on the first component to ensure proper operation of the locking member relative to the legs, installation time and labor is unnecessarily high. It is desirable, therefore, to provide improved retainer clips for the aforesaid purpose and which have other uses in order to expedite manufacture of the clips, eliminate the need for pre-assembly, facilitate installation and servicing of the clips and wires, and to reduce labor and costs involved.

SUMMARY OF THE PRESENT INVENTION

The present invention provides a one-piece plastic retainer clip for releasably securing elongated members, such as electric wires or tubes, on a structure having a stud extending from a surface of said structure. The clip comprises first and second sections initially joined by integrally formed frangible web means. The first section comprises a mounting means including a first tubular member having a first stud-receiving bore therethrough and wire (tube) retainer means including a pair of resilient bifurcated legs defining a slot having a slot opening at one end (or side) for receiving elongated members (wires or tubes) laterally inserted thereinto. The second section comprises a second tubular member having a second bore therethrough for telescopically receiving the first tubular member and having a closure member or plate for engaging the free ends of said legs. Interengageable releasable latch means are provided on the legs and closure member.

The web means are connected between the upper end of the first tubular member and the lower end of the second tubular member. The web means initially operate to hold the tubes in axial alignment and to rigidly secure the second tubular member in an open position wherein the closure member is spaced from the slot opening to enable one or more elongated members to be laterally inserted thereinto. The web means are sufficiently strong to enable manual pressure axially applied on the upper end of the second tubular member to force the first tubular member fully onto the stud to a fully seated position. The web means are frangible in response to further axially applied manual pressure on the second tubular member, after the first tubular member is fully seated, to enable the second tubular member to telescopically slide onto the first tubular member to a closed position wherein the closure member engages the free ends of the legs and closes the slot opening. Locking means, including integrally formed latches on the free ends of the legs and detents formed on the closure member, are releasably engageable with each other when the sections are in closed position to maintain the sections in closed position. Manually squeezing the legs toward each other disengages the latches and allows the second section to be slid manually upwardly on the first section to open position wherein the elongated members are removable laterally from the slot through the slot opening. The second section is detachable from the first section to allow the latter section to be pulled upwardly off of the stud.

A one-piece retainer clip in accordance with the present invention offers several advantages over the prior art. For example, the clip is fabricated as a single piece in a single die in a single plastic injection molding press thereby substantially reducing manufacturing time and costs. The one-piece clip does not require selection, assembly and installation of different parts prior to or during installation, as is the case in some prior art clips, and this substantially reduces installation time and costs. Other objects and advantages of the invention will hereinafter appear.

DRAWINGS

FIG. 7 is a side elevation view, partly in section, of the clip showing it in pre-installed open condition and ready to be associated with a threaded mounting stud rigidly affixed to a structure;

FIG. 8 is a cross-section view taken on line 8—8 of FIG. 10;

FIG. 9 is a view similar to FIG. 7 showing the clip still in open condition but installed on the stud;

FIG. 10 is a view similar to FIG. 9 but showing the clip fully installed on the stud and in fully closed condition and with wires secured therein.

DESCRIPTION OF A PREFERRED EMBODIMENT

Figure 4:
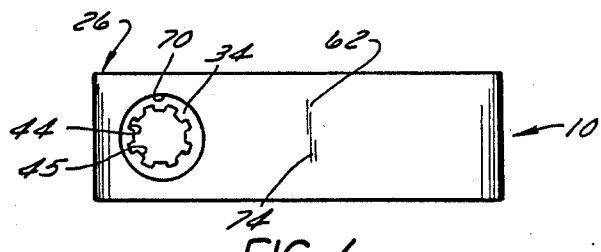
FIG. 4 is a top plan view of the clip of FIG. 2.
Figure 5:
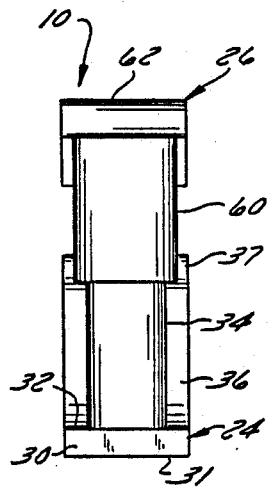
FIG. 5 is an elevation view of the rear side of the clip of FIG. 2.
Figure 2:
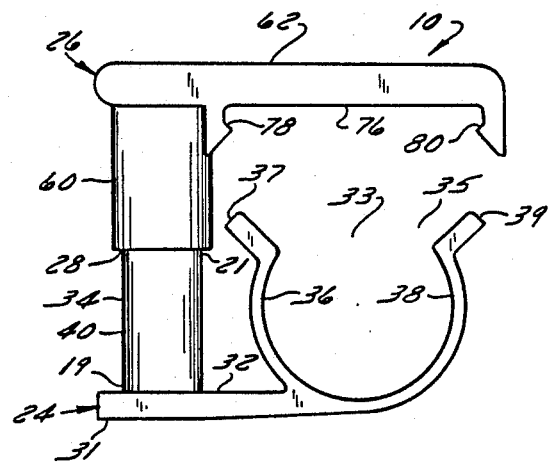
FIG. 2 is a side elevation view of the clip.
Figure 6:
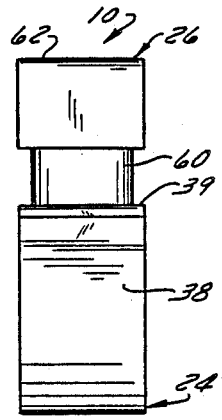
FIG. 6 is an elevation view of the front side of the clip of FIG. 2.

FIGS. 1 through 6 show a retainer clip 10 in accordance with the invention. FIGS. 7 through 10 show clip 10 associated with a threaded mounting stud 12 secured as by welding at 14 to a surface 16 of a structure 18, such as a panel, and by means of which the clip can be releasably mounted on the structure to secure a plurality of elongated members, such as wires 20 (FIG. 10) thereto.

As FIGS. 7 and 8 show, stud 12 comprises a head 50, an unthreaded shank portion 51 and a threaded shank 52.

FIGS. 1 through 7 show clip 10 in open and uninstalled condition or position. FIG. 9 shows clip 10 installed on stud 12 but still open. FIG. 10 shows clip 10 in closed and fully installed condition and with wires 20 releasably secured therein.

Clip 10, which is formed in one piece of resilient slightly deformable plastic, such as Nylon (TM) or the like, by a process of injection molding, comprises a first (lower) section 24 and a second (upper) section 26 which are initially joined by frangible web means 28 (FIG. 9) which operate to initially maintain both sections in open position or condition relative to each other.

First (lower) section 24 and clip 10 which broadly comprises mounting means and wire retainer means, includes a flat base member 30 having a lower side 31 and an upper side 32, a first tubular member 34 integral with and projecting upwardly from upper side 32, and a pair of resilient spaced-apart curved bifurcated legs 36 and 38 which are integral with and project upwardly from upper side 32 to define a wire-receiving slot 33 of generally circular cross-sectional configuration and having a slot opening 35 at its upper end. The legs 36 an 38 are provided on their resiliently movable free ends with outwardly bent flanges or projections or latches 37 and 39, respectively, which are part of a locking means hereinafter described. Tubular member 34, which has a lower end 19, an upper end 21 and a smooth cylindrical outer surface 40, is provided with a first stud-receiving bore 42 therethrough which is axially aligned with a hole 43 through base member 30 which comprises a cylindrical portion 41 and a frustoconical portion 46. As FIGS. 7 and 8 show, bore 42 is defined by cylindrical wall 44 from which a plurality of integrally formed longitudinally extending deformable splines 45 project radially inwardly into bore 42. The inside diameter of wall 44 of bore 42 is slightly greater than the thread diameter of threaded shank 52 of stud 12. The inside diameter between opposite splines 45 in bore 42 is slightly greater than the root diameter of threaded shank 52 but slightly smaller than the thread diameter of threaded shank 52 of stud 12. The diameter of portion 41 of hole 43 is slightly greater than the diameter of stud head 50. The smallest diameter of frustoconical portion 46 of hole 43 is slightly greater than the diameter of unthreaded shank portion 51 of stud 12. As FIG. 7 shows the splines 45 are sloped at their lower ends as at 53 to match the slope of frustoconical portion 46 of bore 42 to facilitate stud insertion.

Figure 3:
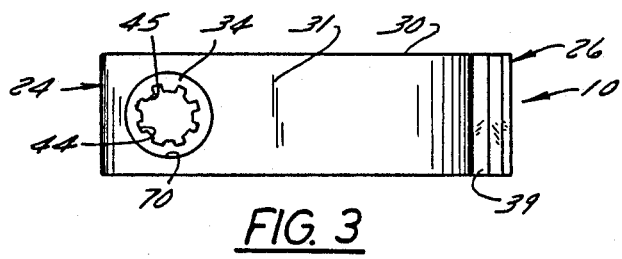
FIG. 3 is a bottom plan view of the clip of FIG. 2.

As FIGS. 3, 8 and 9 show, when threaded stud 12 is fully received in bore 42 of tubular member 34, the threads dig into the resilient splines 45 to firmly secure first section 24 on structure 18.

Second (upper) section 26 of clip 10 comprises a second tubular member 60 and a closure member or plate 62 which is integral with and projects laterally from tubular member 60. Tubular member 60, which has a lower end 64, an upper end 66 and a smooth cylindrical outer surface 68, is provided with a second bore 70 therethrough for slidably receiving first tubular member 34 of lower section 24 in telescoping relationship. Bore 70 is defined by a smooth cylindrical inner wall surface 72 and is of slightly greater inside diameter than the outside diameter of first tubular member 34. The wall of first tubular member 34 is relatively thin and is deformed somewhat by the threads of stud 12 when the latter is inserted into first bore 42. However, as FIG. 10 shows, when clip 10 is fully installed, second tubular member 60 surrounds first tubular member 34 and this effectively strengthens and supports the wall of first tubular member 34 and resists detachment of first tubular member 34 from stud 12.

Figure 1:
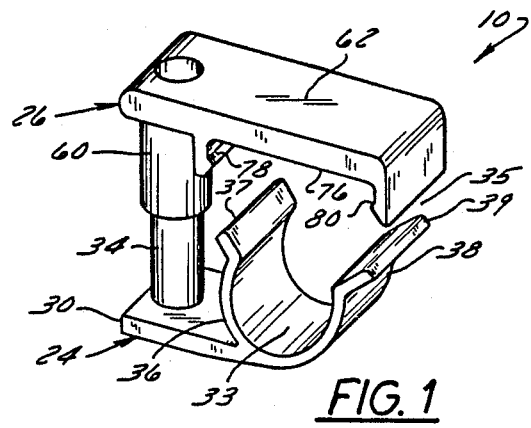
FIG. 1 is a perspective view of a retainer clip in accordance with the present invention.

Closure member or plate 62 has an upper surface 74 and a lower surface 76 which is provided at opposite ends with detents 78 and 80 which form part of the aforementioned locking means and are releasably engageable with the flanges 37 and 39, respectively, on the resilient legs 36 and 38, respectively, of first (lower) section 24. When clip 10 is in open position, lower surface 76 of closure member 62 is spaced from slot opening 35, as shown in FIG. 9, and affords access thereto for lateral insertion of the wires 20 through slot-opening 35 into slot 33. When clip 10 is in closed position, as shown in FIG. 1, lower surface 76 of closure member 62 closes slot opening 35 and the flanges 37 and 39 on the legs 36 and 38, respectively, releasably engage the detents 78 and 80, respectively, on closure member 62 to releasably lock second (upper) section 26 in closed position.

As FIG. 7 shows, the integrally formed frangible web means 28 is connected between upper end 21 of first tubular member 34 and lower end 64 of second tubular member 60. The web means 28 initially operates to hold the tubular members 34 and 60 in axial alignment and to rigidly secure the second tubular member 60 in an open position wherein closure member 62 is spaced from slot opening 35 to enable one or more elongated members 20 to be laterally inserted thereinto. As FIG. 9 shows, the web means 28 are sufficiently strong to enable manual pressure axially applied on upper end 66 of second tublar member 26 to force first tubular member 34 fully onto stud 12 to a fully seated position. As FIG. 10 shows, the web means are frangible in response to further axially applied manual pressure on second tubular member 26, after first tubular member 34 is fully seated against structure 18, to enable second tubular member 26 to telescopically slide onto first tubular member 34 to a closed position wherein closure member 62 engages the free ends of the legs 36 and 38 and closes slot opening 35.

The locking means, which include the latches 37 and 39 on the legs and the detents 78 and 80 on closure member 62, are releasably engageable with each other when the sections 24 and 26 are in closed position to maintain them in closed position. Manually squeezing the legs 36 and 38 together or toward each other disengages the latches and allows second section 26 to be manually slid upwardly on first section 24 to open position wherein the elongated members 20 are removable laterally from slot 38 through slot opening 35. Second section 26 is detachable from first section 24 to allow the latter section to be pulled upwardly off of stud 12.

I claim:

1. A one-piece plastic retainer clip for supporting an elongated member, such as a wire or tube, and mountable on a stud on a structure comprising:
    a first tubular member having a stud-receiving bore for frictionally engaging said stud;
    retainer means connected to said first tubular member and defining a slot having a slot opening for receiving said elongated member laterally inserted thereinto;
    a second tubular member axially movable relative to said first tubular member between open and closed positions and having a second bore for slidably receiving said first tubular member when in closed position;
    a closure member connected to and movable with said second tubular member;
    interengageable latch means on said retainer means and on said closure member;
    and frangible means connected between said first tubular member and said second tubular member,
    said frangible means being operable to initially maintain said second tubular member in axial alignment with and in open position relative to said first tubular member and to initially maintain said closure member in an open position spaced from said slot opening;
    said frangible means being sufficiently strong to remain intact when axial force is exerted on said second tubular member sufficient to force said first tubular member onto said stud;
    said web means being frangible, when axial force is exerted on said second tubular member after said stud is received in said first tubular member, to enable said second tubular member to be slid onto said first tubular member and thereby move said closure member to a closed position wherein it blocks said slot opening and wherein said latch means interengage to maintain said closure member and said second tubular member in closed position.

2. A clip according to claim 1 wherein each tubular member has a lower end and an upper end and wherein said frangible means is connected between the upper end of said first tubular member and the lower end of said second tubular member.

3. A clip according to claim 1 or 2 wherein said retainer means comprises at least one resilient leg having a free end and defining a side of said slot, and wherein said interengageble latch means comprises a latch member on said free end of said leg and a latch member on said closure member.

4. A clip according to claim 1 or 2 wherein said retainer means comprises a pair of resilient legs having free ends, wherein said closure member comprises a recess for receiving the free ends of said legs, and wherein said latch means comprises latch members on the free ends of said legs and latch members on said closure member adjacent said recess.

5. A clip according to claim 1 or 2 wherein said stud-receiving bore in said first tubular member comprises axially extending splines for frictionally engaging said stud.

6. A one-piece plastic retainer clip for supporting an elongated member, such as a wire or tube, and mountable on a stud on a structure comprising:
    a first tubular member having a stud-receiving bore for frictionally engaging said stud;
    a pair of resiliently movable spaced apart legs connected to said first tubular member and defining a slot having a slot opening for receiving said elongated member laterally inserted thereinto;
    a second tubular member axially movable relative to said first tubular member between open and closed positions and having a second bore for slidably receiving said first tubular member when in closed position;
    a closure member connected to and movable with said second tubular member;
    interengageable latch means on at least one of said resiliently movable legs and on said closure member;
    and frangible web means connected between said first tubular member and said second tubular member,
    said web means being operable to initially maintain said second tubular member in axial alignment with and in open position relative to said first tubular member and to initially maintain said closure member in an open position spaced from said slot opening;
    said web means being sufficiently strong to remain intact when axial force is exerted on said second tubular member sufficient to force said first tubular member onto said stud;
    said web means being frangible, when axial force is exerted on said second tubular member after said stud is received in said first tubular member, to enable said second tubular member to be slid onto said first tubular member and thereby move said closure member to a closed position wherein it blocks said slot opening and wherein said latch means interengage to maintain said closure member and said second tubular member in closed position.

7. A clip according to claim 6 wherein each tubular member has a lower end and an upper end and wherein said frangible means is connected between the upper end of said first tubular member and the lower end of said second tubular member.

8. A clip according to claim 6 or 7 wherein said closure member comprises a recess for receiving the free ends of said legs, and wherein said latch means comprises latch members on the free ends of said legs and latch members on said closure member adjacent said recess.

9. A clip according to claim 8 wherein said stud-receiving bore in said first tubular member comprises axially extending splines for frictionally engaging said stud.

* * * * *